United States Patent
Sugimoto

(10) Patent No.: US 8,797,423 B2
(45) Date of Patent: *Aug. 5, 2014

(54) SYSTEM FOR AND METHOD OF CONTROLLING A PARAMETER USED FOR DETECTING AN OBJECTIVE BODY IN AN IMAGE AND COMPUTER PROGRAM

(75) Inventor: Masahiko Sugimoto, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 596 days.

This patent is subject to a terminal disclaimer.

(21) Appl. No.: 12/898,980

(22) Filed: Oct. 6, 2010

(65) Prior Publication Data

US 2011/0025882 A1   Feb. 3, 2011

Related U.S. Application Data

(63) Continuation of application No. 11/782,816, filed on Jul. 25, 2007, now Pat. No. 7,893,969.

(30) Foreign Application Priority Data

Jul. 25, 2006 (JP) ................................ 2006/202426
Jul. 17, 2007 (JP) ................................ 2007/185163

(51) Int. Cl.
  *H04N 5/243* (2006.01)
  *H04N 5/235* (2006.01)
(52) U.S. Cl.
  CPC ................................. *H04N 5/2352* (2013.01)
  USPC ..................................................... 348/230.1
(58) Field of Classification Search
  CPC . H04N 5/2353; H04N 5/2351; H04N 5/2352;
  H04N 9/045; H04N 5/232; H04N 5/772;
  H04N 5/272; H04N 2101/00; H04N 5/202;
  H04N 5/243; H04N 9/69
  USPC ......... 348/222.1, 229.1, 230.1, 239, 254, 255
  See application file for complete search history.

(56) References Cited

U.S. PATENT DOCUMENTS

| | | | |
|---|---|---|---|
| 5,103,305 A | 4/1992 | Watanabe | |
| 7,038,715 B1 | 5/2006 | Flinchbaugh | |
| 7,428,012 B2 | 9/2008 | Sakamoto et al. | |
| 2002/0008771 A1 | 1/2002 | Uchino et al. | |
| 2004/0001158 A1* | 1/2004 | Aoki | 348/345 |
| 2005/0001924 A1* | 1/2005 | Honda | 348/348 |
| 2005/0185837 A1 | 8/2005 | Takano et al. | |
| 2005/0200744 A1* | 9/2005 | Kobayashi | 348/362 |
| 2006/0012702 A1* | 1/2006 | Kawahara et al. | 348/345 |

(Continued)

FOREIGN PATENT DOCUMENTS

| | | |
|---|---|---|
| EP | 0 420 657 A2 | 4/1991 |
| JP | 2001-298660 A | 10/2001 |

(Continued)

OTHER PUBLICATIONS

Notice of Grounds for Rejection, dated Feb. 28, 2012, issued in corresponding JP Application No. 2007-185163, 5 pages in English and Japanese.

*Primary Examiner* — Aung S Moe
(74) *Attorney, Agent, or Firm* — Sughrue Mion, PLLC

(57) ABSTRACT

When detecting an objective body from a taken image, a scene of the image is determined, and a parameter to be used in detecting the objective body is controlled according to result of the determination.

28 Claims, 11 Drawing Sheets

(56) References Cited

U.S. PATENT DOCUMENTS

| | | |
|---|---|---|
| 2006/0077264 A1 | 4/2006 | Ikeda |
| 2006/0245007 A1* | 11/2006 | Izawa et al. .................. 358/448 |
| 2007/0115371 A1 | 5/2007 | Enomoto et al. |
| 2007/0223812 A1 | 9/2007 | Ito |
| 2007/0288973 A1* | 12/2007 | Glatron et al. ................ 725/105 |
| 2008/0218612 A1* | 9/2008 | Border et al. ................. 348/262 |
| 2011/0242363 A1* | 10/2011 | Nozaki et al. .............. 348/222.1 |

FOREIGN PATENT DOCUMENTS

| | | |
|---|---|---|
| JP | 2001-330882 A | 11/2001 |
| JP | 2005-4287 A | 1/2005 |
| JP | 2005-192162 A | 7/2005 |
| JP | 2006-018523 A | 1/2006 |
| JP | 2006-039666 A | 2/2006 |
| WO | 2006129777 A1 | 12/2006 |

* cited by examiner

HORIZONTAL   VERTICAL   OBLIQUE(NE)   OBLIQUE(NW)

SYSTEM FOR AND METHOD OF CONTROLLING A PARAMETER USED FOR DETECTING AN OBJECTIVE BODY IN AN IMAGE AND COMPUTER PROGRAM

CROSS REFERENCE

This is a continuation of U.S. patent application Ser. No. 11/782,816, filed on Jul. 25, 2007, which claims priority from Japanese Patent Application No. 2006/202426 filed Jul. 25, 2006, each of which is incorporated by reference in its entirety.

BACKGROUND OF THE INVENTION

1. Field of the Invention

This invention relates to a system such as a digital camera for obtaining an image by an image-taking.

2. Description of the Related Art

There has been expected, when taking an image of an objective body such as a human in an image-taking system such as a digital camera or a video camera, to detect the objective body from a taken image (an image of the object) in order to set focus, exposure and the like suitable for taking the image and to apply various image processings to the taken image.

Since the image taken by the image-taking system is not always constant in the image-taking conditions, there is proposed a method, in Japanese Unexamined Patent Publication No. 2005-004287, where positions in which the correlations with a template image is not smaller than a threshold value are detected as the face area from the object image and the threshold value is changed according to the brightness of the objective body, thereby improving the face detecting performance.

However, the technique disclosed in Japanese Unexamined Patent Publication No. 2005-004287 where the threshold value is changed according to the brightness of the objective body cannot sufficiently deal with the change in the image-taking conditions, and is sometimes insufficient in its detecting performance.

SUMMARY OF THE INVENTION

In view of the foregoing observations and description, the primary object of the present invention is to provide an image-taking system whose detecting performance can be improved according to various changes in the image-taking conditions.

An image-taking system of the present invention is characterized by having an objective body detecting means which detects an objective body from a taken image, a scene determining means which determines a scene of the image, and a parameter control means which controls a parameter to be used in detecting the objective body according to result of determination by the scene determining means.

The "parameter" means an auxiliary variable used by the objective body detecting means. For example, the "parameter" may be a figure including one or more of a gain in the gain correction, a threshold value for determining detection, a degree of noise reduction in the noise reduction, a degree of contour correction and a γ curve which are used by the objective body detecting means.

In the above image taking system, the objective body detecting means may detect the objective body by detecting the objective body from the image by the use of a plurality of parameters of different values including the corrected parameter corrected by the parameter control means and taking as the result of objective body detection by integrating a plurality of the results of detection.

The parameter control means may change the parameter when no objective body is detected with the parameter before change.

Further, the parameter control means may be provided with a scene determining means and control the parameter according to the result of determination by the scene determining means.

The scene determining means may determine the scene by one or more determinations of a backlight determination, an exposure determination, a brightness determination and a noise determination.

The scene of an image is, for instance, a condition of an image affecting detection of the objective body such as a backlight scene, a night scene, an underwater scene or the like.

Further, the parameter control means may change the method of controlling the parameter according to the timing at which the image to which the objective body detecting means carries out the objective body detection is taken or at which the objective body detecting means carries out the objective body detection. The objective body detection may include various pre-treatments to be effected before the main part of the detection without limited to the main part.

An image-taking method of the present invention is characterized by the steps of detecting an objective body from a taken image, determining a scene of the image, and controlling a parameter to be used in detecting the objective body according to result of determination by the scene determining means.

A computer program for causing a computer to execute the image-taking method of the present invention may be provided recorded on a computer readable medium.

A skilled artisan would know that the computer readable medium is not limited to any specific type of storage devices and includes any kind of device, including but not limited to CDs, floppy disks, RAMs, ROMs, hard disks, magnetic tapes and internet downloads, in which computer instructions can be stored and/or transmitted. Transmission of the computer code through a network or through wireless transmission means is also within the scope of this invention. Additionally, computer code/instructions include, but are not limited to, source, object and executable code and can be in any language including higher level languages, assembly language and machine language.

The image-taking system of the present invention, since having an objective body detecting means which detects an objective body from a taken image and a parameter control means which controls a parameter to be used in detecting the objective body, can change the parameter, even when the image-taking situation is changed, to a parameter suitable to detect an objective body from an image taken under the changed image-taking situation, the objective body detecting performance is improved.

In the system when the objective body detecting means may detect the objective body by detecting the objective body from the image by the use of a plurality of parameters of different values including the corrected parameter corrected by the parameter control means and taking as the result of objective body detection by integrating a plurality of the results of detection, the objective body detecting performance is further improved.

When the parameter control means changes the parameter when no objective body is detected with the parameter before change, the objective body detecting performance is improved by detecting the object body by the use of the corrected parameter.

When the system is further provided with a scene determining means and the parameter control means controls the parameter according to the result of determination by the scene determining means, the parameter suitable to detect the objective body from the image can be efficiently determined on the basis of the result of determination of the scene, whereby the objective body detecting performance can be improved.

When the parameter control means changes the method of controlling the parameter according to the timing at which the image on which the objective body detecting means carries out the objective body detection is taken or at which the objective body detecting means carries out the objective body detection, the parameter suitable to detect the objective body from the image can be efficiently determined on the basis of the timing at which the image is taken.

DESCRIPTION OF THE PREFERRED EMBODIMENT

Figure 1:
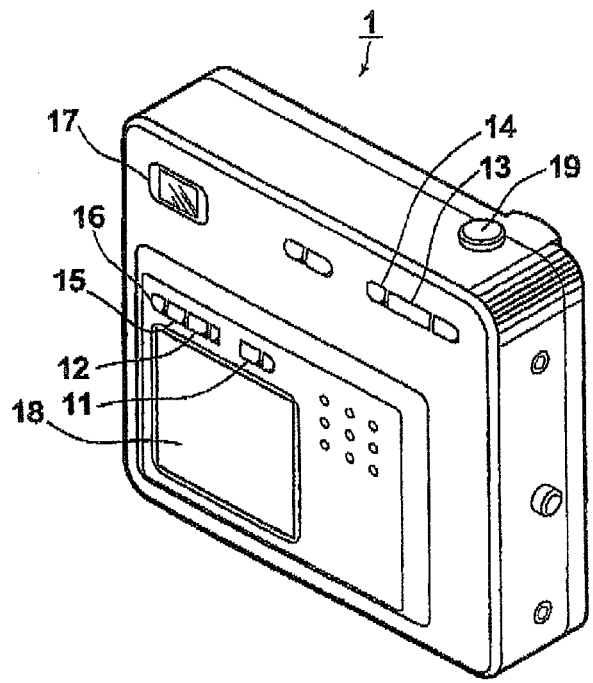
FIG. 1 is a perspective view showing a digital camera in accordance with a first embodiment of the present invention as viewed from rear.
Figure 2:
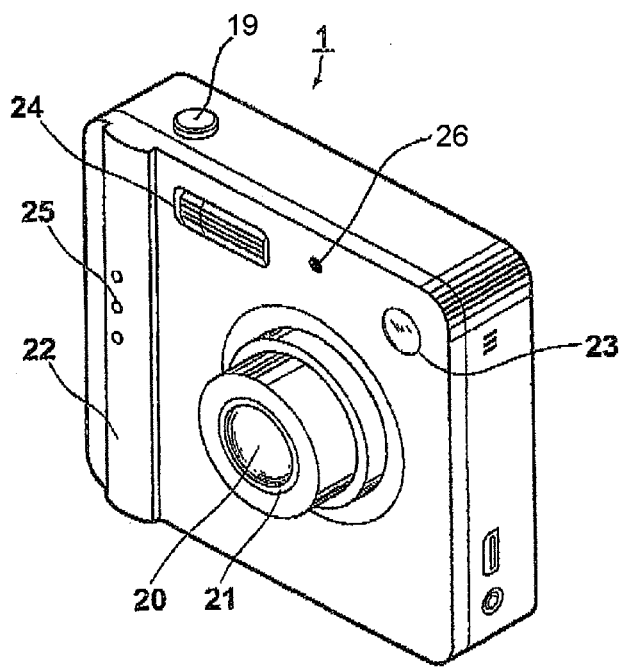
FIG. 2 is a perspective view showing the digital camera of the first embodiment as viewed from front.

Embodiments of the present invention will be described with reference to the drawings, hereinbelow. FIG. 1 is a perspective view showing a digital camera in accordance with a first embodiment of the present invention as viewed from rear. As shown in FIG. 1, as an interface for control by the photographer, an action mode switch 11, a menu/OK button 12, a zoom/up and down lever 13, a right and left button 14, a back (return) button 15 and a display switching button 16 are provided on the rear surface of the body of the digital camera 1. The rear surface of the body of the digital camera 1 is further provided with a finder 17 for image taking and a liquid crystal monitor 18 and the upper surface of the camera body is provided with a shutter release button 19. Further, FIG. 2 is a perspective view showing the digital camera of the first embodiment as viewed from front. As shown in FIG. 2, a taking lens 20, a lens cover 21, a power switch 22, the finder window 23, a strobe light 24, a self-timer lamp 25 and an AF auxiliary lamp 26 are provided on the front surface of the camera body 10 and a media slot 27 is provided on a side surface thereof.

The action mode switch 11 is a slide switch for switching the action modes between a still image taking mode, an animation taking mode and a reproduction mode.

The menu/OK button 12 is a button for displaying on the monitor 18 various menus for setting the kind of the image taking mode, a strobe lighting mode, recording pixel number or sensitivities in response to depression thereof, and for selection/setting on the basis of the menu displayed on the monitor 18. Further, by the menu/OK button 12, it is possible to set the image taking mode to a full auto-mode where the exposure and the white balance are all automatically set or a manual mode where the exposure and the white balance are all manually set.

When the zoom/up and down lever 13 is inclined up and down, tele/wide of the camera 1 is adjusted when an image is to be taken and the cursor displayed in the menu screen displayed on the monitor 18 is moved up and down when various values are set.

The right and left button 14 is a button for moving right and left the cursor in the menu screen displayed on the monitor 18 when various values are set.

When the back (return) button 15 is depressed, setting of the various values is interrupted, and the preceding screen is displayed on the monitor 18.

The display switching button 16 is a button for switching, for instance, ON and OFF of the display on the monitor 18, various guidance messages, ON and OFF of the character display when depressed.

The finder 17 is for focusing the object and adjusting the composition when the user takes an image of the object. The image of the object viewed through the finder 17 is displayed through a window 23.

The contents set by the control of the button or the lever can be recognized through the display on the monitor 18, the lamp in the finder, the position of the slide lever or the like.

Further, the monitor 18 displays a through image for confirming the object when taking an image. With this arrangement, the monitor 18 reproduces a still image and an animation after photographing and various values set in the menus as well as functions as an electronic viewfinder.

The shutter release button 19 is a switch which is depressed in two stages. When the shutter release button 19 is semi-depressed by the user, various image-taking preparations such as an automatic exposure control or an automatic focus control are carried out. When the shutter release button 19 is fully-depressed in this state, an image is taken on the basis of the exposure and the focusing position determined and the image displayed on the monitor 18 is recorded.

The taking lens 20 is for imaging an image of the object on a predetermined imaging surface (a CCD or the like in the digital camera 1) and comprises a focusing lens, a zoom lens and the like. The lens cover 21 covers the surface of the taking lens 20, for instance, when the power source of the digital camera 1 is off or when the digital camera 1 is in the reproduction mode, to protect the taking lens 20 from stain, dirt and the like. The power switch 22 turns on and off the power source of the digital camera 1. The strobe light 24 momentarily irradiates the object with a necessary amount of light while the shutter release button 19 is depressed and the shutter in the camera body 10 is opened. The self-timer lamp 25 is for informing the object of the shutter open/close timing when an image is taken with the self-timer.

Figure 3:
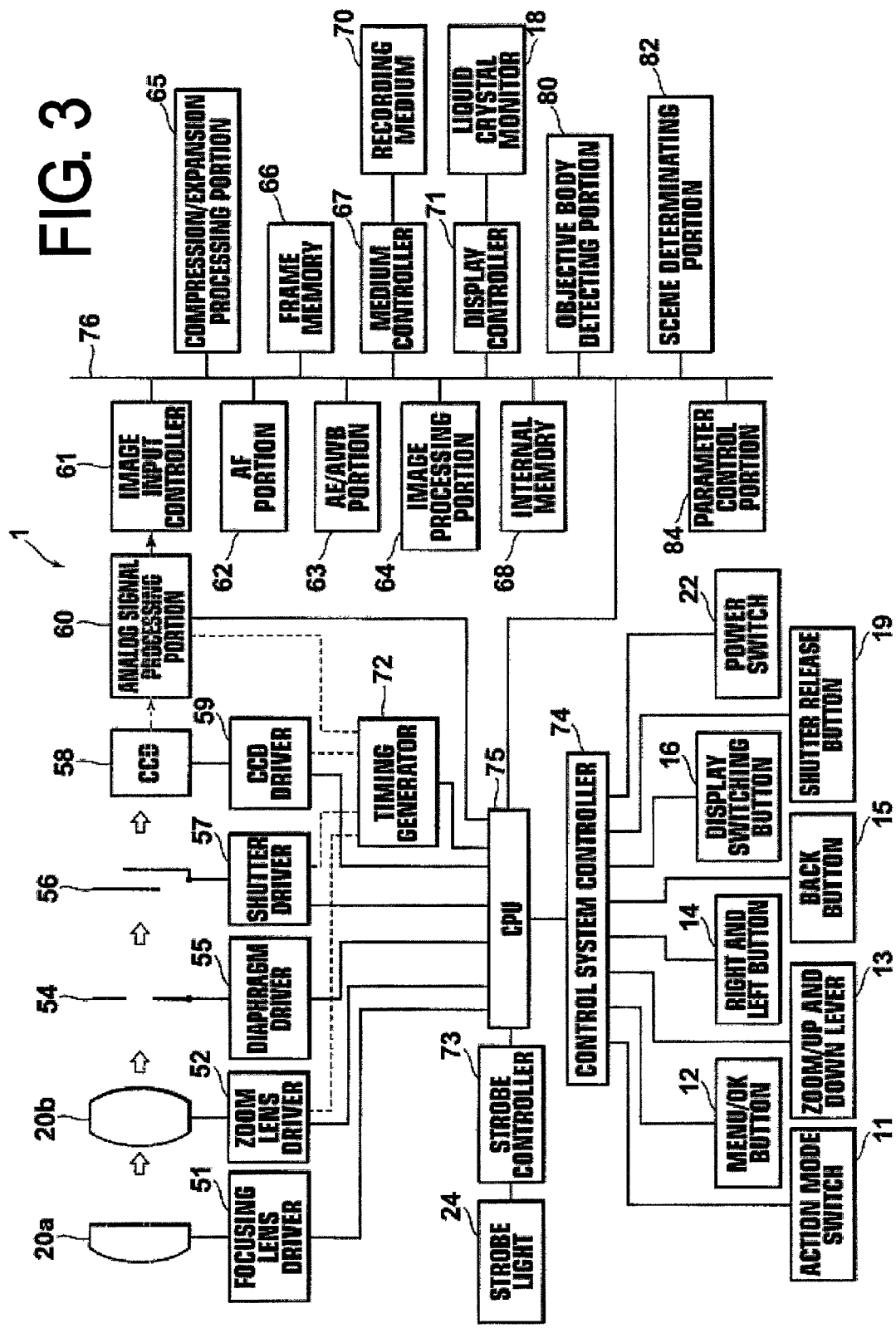
FIG. 3 is a block diagram showing structures of the digital camera of the first embodiment.

FIG. 3 is a block diagram showing functions of the digital camera 1. The digital camera 1 shown in FIG. 3 converts image data obtained by the image taking to an image file in the Exif format and records it on an external recording medium 70 detachable from the camera body.

As the control system of the digital camera 1, there are provided the action mode switch 11, menu/OK button 12, zoom/up and down lever 13, right and left button 14, back (return) button 15, display switching button 16, shutter release button 19, power switch 22 and a control system control portion 74 which is an interface for transferring the contents of control of the elements described above to a CPU 75.

As an optical system, a focusing lens 20a and a zoom lens 20b are provided. The lenses 20a and 20b are stepwise driven respectively by a focusing lens driver 51 and a zoom lens driver 52 comprising an electric motor and a motor driver to be moved in the direction of the optical axis. The focusing lens driver 51 stepwise drives the focusing lens 20a on the basis of focus driving amount data output from an AF portion 62. The zoom lens driver 51 stepwise drives the zoom lens 20b on the basis of data on the amount of control of the zoom/up and down lever 13.

A diaphragm 54 is driven by a diaphragm driver 55 comprising an electric motor and a motor driver. The diaphragm driver 55 adjusts the diameter of opening of the diaphragm 54 on the basis of diaphragm data output from an AE/AWB portion 63.

Shutter 56 is a mechanical shutter and is driven by a shutter driver 57 comprising an electric motor and a motor driver. The shutter driver 57 controls open/closure of the shutter 56 on the basis of a signal generated in response to depression of the shutter release button 19 and shutter speed data output from the AE/AWB portion 63.

Behind the optical system described above, a CCD 58 which is an image-taking element is provided. The CCD 58 has a photoelectric surface comprising a lot of two-dimensionally arranged light receiving elements, and an image of the object passing through the optical system is imaged on the photoelectric surface to be photoelectrically converted. Forward of the photoelectric surface, there are disposed a microlens array for collecting light on each of the pixels and a color-filter array comprising a lot of red filters, green filters and blue filters which are regularly arranged. The CCD 58 outputs electric charges accumulated by the pixels line by line as serial analog image-taking signals in synchronization with vertical and horizontal clock signals supplied from a CCD control portion 59. The electric charge accumulating time of each pixel, that is, the exposure time, is determined by an electronic shutter-drive signal given by the CCD control portion 59. The CCD 58 has been adjusted in its gain by the CCD control portion 59 so that an analog image-taking signals of a predetermined amplitude can be obtained.

The analog image-taking signals output from the CCD 58 is input into an analog signal processing portion 60. The analog signal processing portion 60 comprises a correlation double sampling circuit (CDS) for removing noise of the image signal, an auto-gain controller (AGC) for adjusting the gain of the analog signal and an A/D converter (ADC) for converting the analog signal to a digital image data. The digital image data is a CCD-RAW data having R, G, B density values by each of the pixels.

A timing generator 72 generates timing signals, and the timing signals are input into the shutter driver 57, the CCD control portion 59 and the analog signal processing portion 60 to synchronize operation of the shutter button 19, open and closure of the shutter 56, taking in of the electric charge of the CCD 58 and processing by the analog signal processing portion 60.

A strobe control portion 73 causes the strobe light 24 to emit light upon image taking. Specifically, so long as the strobe light emission mode is on and the strobe light emission mode is the auto mode, strobe light 24 is turned on to light the strobe light 24 upon image taking when the brightness of the pre-image (to be described later) is lower than the predetermined brightness. On the other hand, when the strobe light emission mode is off, the strobe light 24 is inhibited from being lit upon image taking.

The strobe control portion 73 determines the amount of light to be emitted from the strobe light 24 on the basis of the focusing position obtained by the AF portion 62 so that the amount of light to be emitted increases as the focusing position becomes further. The amount of light to be emitted from the strobe light 24 at this time is taken as a first amount of light to be emitted. When the strobe light 24 is to be lit upon taking an image, the amount of light to be emitted from the strobe light 24 is determined to be a second amount smaller than the first amount so long as a face is included in a pre-image obtained by the pre-image taking. Here the amount of light may have to be small not to generate a white spot in the face, and the degree thereof may be empirically determined.

An image input controller 61 writes, in a frame memory 66, the CCD-RAW data input from the analog signal processing portion 60. The frame memory 66 is a working memory for use when each of various digital image processing (signal processing) to be described later is to be carried out on the image data, and may comprise an SDRAM (synchronous dynamic random access memory) which transfers data in synchronization with bus clock signals of a constant period.

A display control portion 71 is for displaying, on the monitor 18, image data stored in the frame memory 66 as a through image, and for displaying, on the monitor 18, image data stored in the external recording medium 70 when the reproduction mode has been set. The through image is taken at predetermined time intervals by the CCD 58 while the image taking mode is selected.

The AF portion 62 and the AE/AWB portion 63 determines the image-taking conditions on the basis of the pre-image. The pre-image is represented by image data stored in the frame memory 66 as a result from the CPU 75 causing the CCD 58 to execute pre-image taking upon detection of a semi-depression signal generated in response to semi-depression of the shutter release button 19.

The AF portion 62 detects the focusing position on the basis of the pre-image and outputs focusing-lens drive amount data (AF processing). As the system for detecting the focusing point, a passive system where the focusing point is detected on the basis of a feature that the contrast of an image in focus increases.

The AE/AWB portion 63 measures the brightness of the object on the basis of the pre-image and determines diaphragm value and shutter speed on the basis of the measured brightness of the object, thereby determining the diaphragm value data and shutter speed data as the set value of exposure (AE processing) while automatically adjusts white balance (AWB processing) upon image-taking When the image-taking is in the manual mode, the operator of the digital camera 1 can manually set the exposure and the white balance. Even when the exposure and the white balance are automatically set, they can be manually adjusted by operator's instruction through the control system such as the menu/ok button 12.

An image processing portion 64 carries out image quality corrections on the image data of the running image such as a γ-correction, a sharpness correction and a contrast correction, and carries out YC processing where the CCD-RAW data is converted to YC data comprising Y data which is a brightness signal, Cb data which is a blue difference signal and Cr data which is a red difference signal. This "running image" is an image based on image data which is stored in the frame memory 68 by way of the analog signal processing portion 60 and the image input controller 61 after an image signal is output from the CCD 58 in taking the running image to be executed in response to full-depression of the shutter release button 19. Though the upper limit of the number of pixels of the "running image" is governed by the number of pixels of the CCD 58, the number of pixels used in the recording can be changed, for instance, by the user's setting an image quality (fine, normal and the like). On the other hand, the number of pixels of the through image and/or a pre-image may be smaller than that of the running image, for instance, about 1/16 thereof.

A compression/expansion processing portion 65 compresses, for instance, in JPEG format, image data which has been processed with a correction and the conversion by the image processing portion 64 and generates an image file. To this image file, a tag in which information such as photographing date is stored on the basis of the JPEG format or the like is attached. This compression/expansion processing portion 65, in a reproduction mode, reads out the compressed image file from the external recording medium 70 and expands it. Expanded image data is output to the monitor 18.

The medium control portion 67 accesses the external recording medium 70 to control read and write of the image file.

An internal memory 68 stores various constants set in the digital camera 1 and a program to be executed by the CPU 75.

The objective body detecting portion 80 detects the objective body from the taken image and outputs a result of detection.

Figure 4:
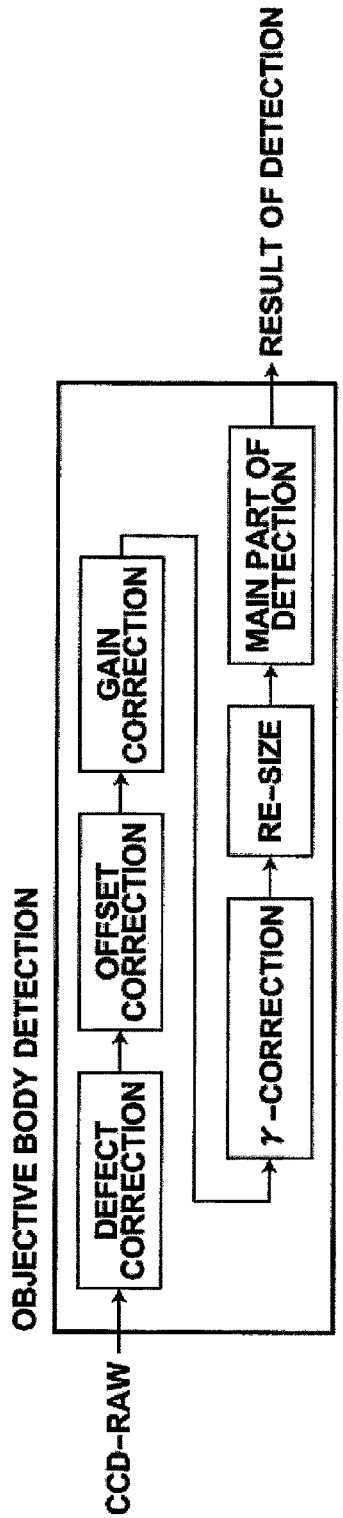
FIG. 4 is a view for illustrating objective body detection by the objective body detecting means (First)

The objective body detection includes various pre-treatments to be effected before the main part of the detection as well as the main part. Specifically, as shown in FIG. 4, the objective body detecting portion 80 inputs CCD-RAW data output from the analog signal processing portion 60 and carries out various digital signal processes such as the defect correction, offset correction, gain correction, contrast correction, γ-correction or the re-size as the pre-treatments on the input image data and outputs a result of the main part of the detection in which it detects from the processed image data a position where the correlations with a template image is not smaller than a threshold value.

Further, the objective body detecting portion 80 detects as face area the area having features of the face included in the face (for instance, has a skin color, has eyes, or has a contour of the face, or the like).

For example, technique disclosed in Japanese Unexamined Patent Publication No. 2006-202276 can be employed. The technique disclosed in Japanese Unexamined Patent Publication No. 2006-202276 is conceivable that the face pursuit is based on a machine learning technique employing Adaboost where a known technique such as movement vectors, detection of a feature point or the like and learning data are updated time to time by weighting them upon re-sampling and the obtained machines are finally added up with the weight for the learning machines to make integrated learning machines. It is a technique, for instance, for detecting positions of points representing landmarks from image of faces by the use of distinguishers obtained by carrying out learning on brightness profiles of points of a plurality of sample images which are known as predetermined landmarks and which are known as not a predetermined landmark by a machine learning technique upon construction of a frame model by fitting an averaged frame model in the actual face image and changing the averaged frame model so that the position of each landmark on the averaged frame model conforms to the position of the correspondent landmark detected from the face and distinguishing conditions for each of the distinguishers. It is possible to employ the technique of Japanese Unexamined Patent Publication No. 2004-334836. The technique of Japanese Unexamined Patent Publication No. 2004-334836 is a technique for detecting whether there is an image of a featured part in image data to be processed by cutting out image data of a predetermined size from the image data and comparing the image data cut out with the reference data of the featured part. As the technique disclosed in Japanese Unexamined Patent Publication No. 2007-11970, a face of animal and the like may be detected as the particular object instead of a face of human.

In any of technique disclosed in Japanese Unexamined Patent Publication Nos. 2006-202276, 2004-334836 and 2007-11970, whether it is a face is determined on the basis of the face detecting threshold value. The face detecting threshold value represents the threshold value under which the likelihood of face (score of the face) is determined. Further, the face detecting threshold value includes a threshold value set by the correlation with the image on the face template.

Further, in the objective body detecting portion 80, for instance, a sub-window scans the running image or the through image at intervals of a plurality of pixels to generate a plurality of fractional images. The technique may be a technique where fractional images which are fullfaces or side faces are detected out of generated fractional images by a full face detecting means and a side face detecting means.

When a detecting mode switching means is provided and a mode is switched to one of a detecting factor mode, a misdetection suppressing mode, a calculation speed mode, a full face detection mode and a side face detection mode, the parameter control portion may change the detection determination threshold value which governs the detecting performance of the full face detecting means and the side face detecting means so that faces are detected putting an importance on the detecting performance in the full face detecting means and the side face detecting means.

It is possible to employ the technique of Japanese Unexamined Patent Publication No. 2007-94633.

Further, the objective body detecting portion 80 can detect movement vectors from the through image or the image data. The objective body detecting portion 80 may be controlled to change the detection determination threshold value which governs the detecting performance so that the through image or the image data can better exhibit the side face detecting means on the basis of that there are predetermined number of objective bodies, which are large in the amount of the movement vectors, in the through image or the image data.

Further, the objective body detecting portion 80 may be controlled to change the detection determination threshold value which governs the detecting performance so that the through image or the image data can exhibit the side face detecting means more efficiently than the full face detecting means on the basis of that there are predetermined number of objective bodies, which are large in the amount of the movement vectors, in the through image or the image data.

Figure 11:
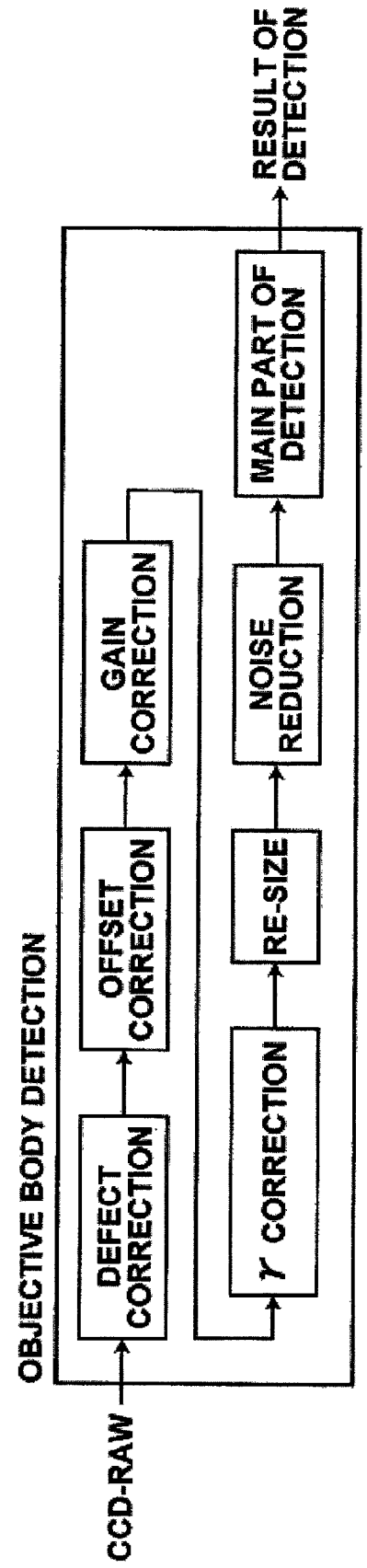
FIG. 11 is a view for illustrating objective body detection by the objective body detecting means (Second)

As shown in FIG. 11, the objective body detecting portion 80 may input CCD-RAW data output from the analog signal processing portion 60 and may carry out various digital signal processes such as the defect correction, offset correction, gain correction, contrast correction, γ-correction, the re-size or the noise reduction as the pre-treatments on the input image data to output a result of the main part of the detection where it detects from the processed image data a position in which it is not smaller than a face-detecting threshold value.

Figure 12:
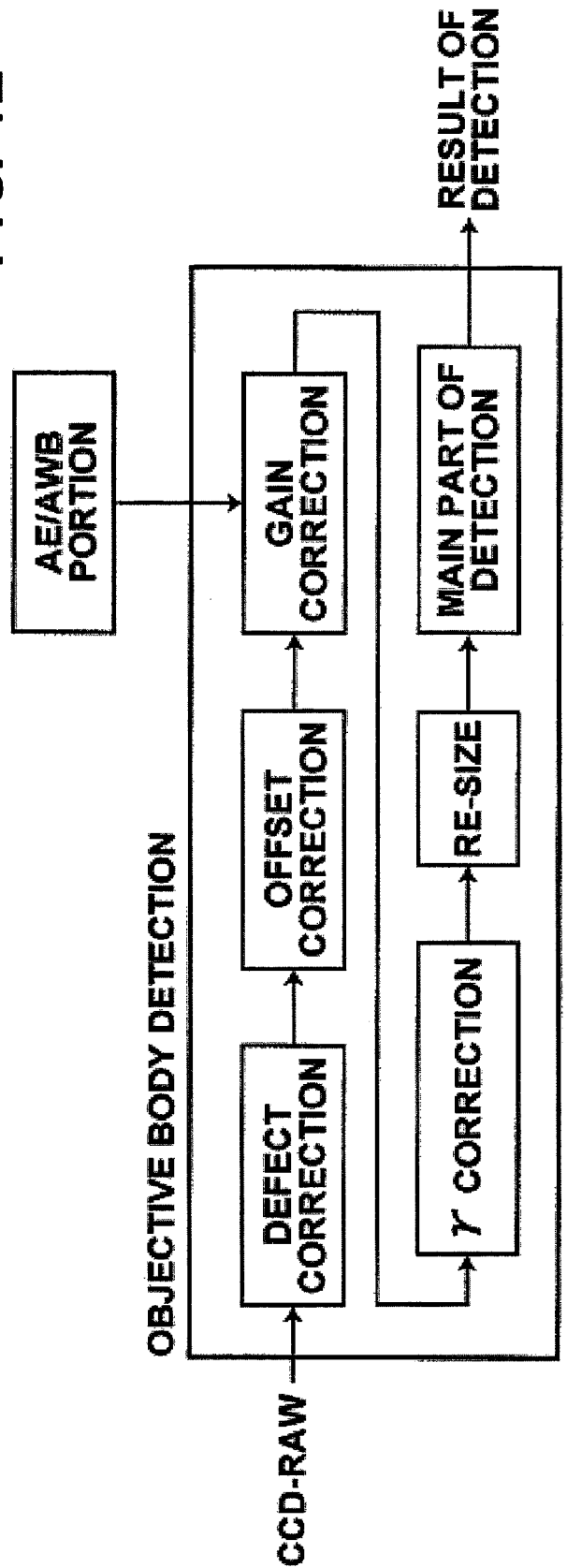
FIG. 12 is a view for illustrating objective body detection by the objective body detecting means (Third)

Further, as shown in FIG. 12, the objective body detecting portion 80 may input CCD-RAW data output from the analog signal processing portion 60 and may carry out various digital signal processes such as the defect correction, offset correction, gain correction, contrast correction, γ-correction, or the re-size (the noise reduction may be carried out after the re-size) as the pre-treatments on the input image data to output a result of the main part of the detection where it detects from the processed image data a position in which it is not smaller than a face-detecting threshold value.

Figure 13:
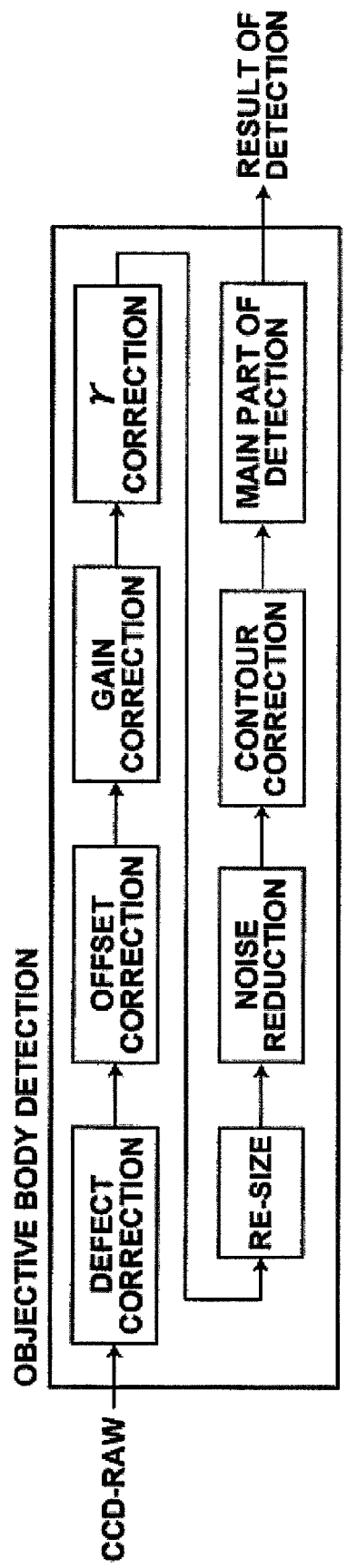
FIG. 13 is a view for illustrating objective body detection by the objective body detecting means (Fourth).

Further, as shown in FIG. 13, the objective body detecting portion 80 may input CCD-RAW data output from the analog signal processing portion 60 and may carry out various digital signal processes such as the defect correction, offset correction, gain correction, contrast correction, γ-correction, the re-size, the noise reduction or the contour correction as the pre-treatments on the input image data to output a result of the main part of the detection where it detects from the processed image data a position in which it is not smaller than a face-detecting threshold value. The parameters used in the objective body detection such as gain in the gain correction or the set threshold value of the correlations in the main part of the detection are controlled by a parameter control means 84 to be described later. The parameters used in the objective body detection are controlled separately from those used in the image quality correction to be carried out on an image for display or recording. With this arrangement, even if the value of gain to be used in the gain correction of a face detection to be carried out on an image which is high in the degree of the backlight is sufficiently large in order to improve the face detecting performance, there are generated no white spot in the image to be displayed or recorded.

Further, as shown in FIG. 12, the parameters may be controlled by the parameter control means 84 when the gain is set in the gain correction according to the value of the gain for the white balance obtained from the AE/AWB portion 63.

Figure 5:
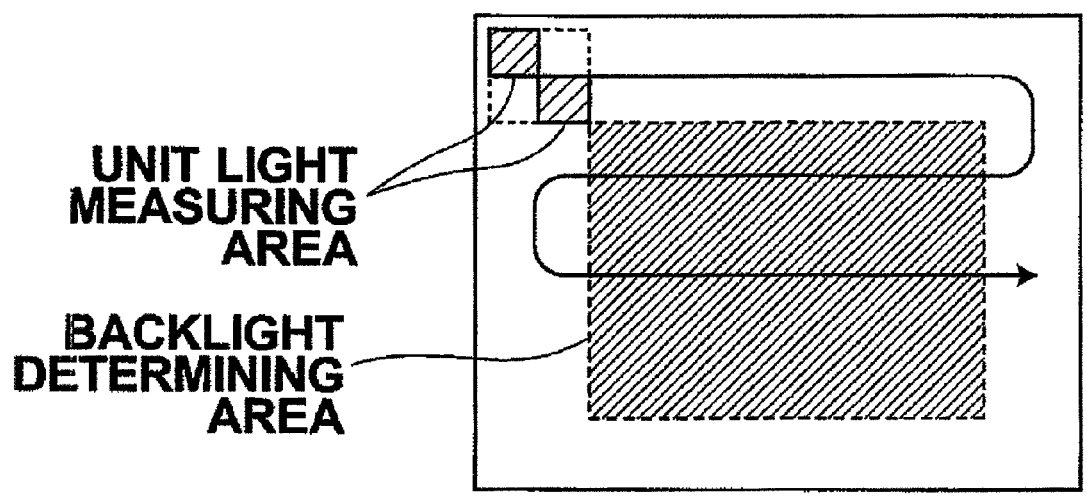
FIGS. 5 and 6 are views for illustrating backlight determination by the scene determining means.
Figure 6:
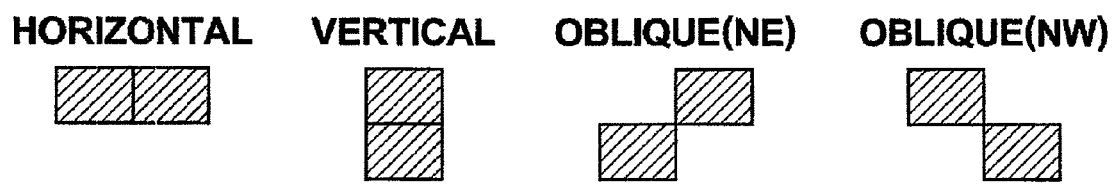

The scene determining portion 82 determines the scene of the taken image (a backlight scene, a night scene, an underwater scene or the like). The backlight determination which is one of the scene determination processings will be described with reference to FIGS. 5 and 6, hereinbelow. A rectangular area of a predetermined size, for instance, 1/16 of the horizontal and the vertical widths of the entire image respectively in its horizontal and vertical widths is taken as a unit light measuring area, and a pair of unit areas adjacent to each other in the horizontal direction, the vertical direction, and oblique directions (NE and NW) are caused to scan a predetermined backlight determining area. When the brightness difference between the measured values of the pair of unit areas is not larger than a set threshold value, it is determined that the scene is a backlight scene, and a maximum value of the brightness difference is calculated as the degree of backlight. Information on the position where the difference between the measured values is maximized and the like may be simultaneously obtained and output.

Further, the scene determining portion 82 need not determine the scene of the taken image by the backlight determination but may determine the same by the brightness determination, the EV value (exposure determination), or the amount of noise. In these processes, whether the image is dark is determined on the basis of the fact that the accuracy in detecting the objective body generally deteriorates when the image is dark or rich in noise.

For example, in the brightness determination, brightness of pixels is determined from a through image or a running image, whereby whether the image is dark is determined.

In determination by the EV value, whether the image is dark is determined on the basis of the EV value, which is an exposure value governed by the diaphragm stop and the exposure time.

In determination by the amount of noise, the amount of noise natural to the CCD 58, which is the image-taking element, is detected from CCD-RAW and the amount of noise is determined.

The parameter control portion 84 controls the parameter used in the objective body detection by the objective body detecting portion 80 according to the result of the scene determination output from the scene determining portion 82. For example, when it is determined that the scene is a backlight scene by the scene determining portion 82, the gain (detecting gain) in the gain correction is calculated (step ST1) according to the degree of backlight output from the scene determining portion 82 and is determined in the range between predetermined upper and lower limits (steps ST2 to ST5).

Further, determination need not be made according to the degree of the backlight but may be made according to the brightness, the EV value, or the degree of noise reduction and the value of the gain (detecting gain) may be calculated according to the EV value and the degree of the brightness or the amount of noise.

The parameter may be a figure including one or more of a degree of noise reduction in the noise reduction, a degree of contour correction in the contour correction and a γ curve in the γ correction which are used by the objective body detecting means.

For example, the parameter may be controlled to control the γ curve in the γ correction according to the degree of the backlight (e.g., in the case when it can be determined to be of backlight).

Further, the parameter may be controlled to increase the degree of contour correction in the contour correction according to the degree of the backlight (e.g., in the case when it can be determined to be of backlight). Further, the parameter may be controlled to increase the degree of noise reduction in the noise reduction according to the degree of the backlight (e.g., in the case when it can be determined to be dark).

Whether the contour correction is to be carried out and the degree of the contour correction may be set by values or characters.

Whether the noise reduction is to be carried out and the degree of the noise reduction may be set by values or characters.

Further, the parameter control portion 84 changes the method of controlling the parameter according to the stage of image taking or the timing at which the processing is carried out on the basis of the signal generated by depression of the shutter release button 19 so that the parameter can be more efficiently controlled. Specifically, when the shutter release button 19 is semi-depressed, so long as a face is detected in a through image immediately before a pre-image is taken by the use of the gain for the backlight, the value of the gain used in detecting the face in the through image is set as the gain to be used in detecting the face in the pre-image and the threshold value of the correlation in the main part of the detection is set to be a predetermined threshold value for a backlight scene.

In the case of setting the threshold value for the EV value on the basis of the EV value, when the shutter release button 19 is semi-depressed, so long as a face is detected in a through image immediately before a pre-image is taken by the use of the gain for the EV value, the value of the gain used in detecting the face in the through image is set as the gain to be used in detecting the face in the pre-image and the threshold value of the correlation in the main part of the detection is set to be a predetermined threshold value for the EV value.

In the case of setting the threshold value for the brightness on the basis of the brightness, when the shutter release button 19 is semi-depressed, so long as a face is detected in a through image immediately before a pre-image is taken by the use of the gain for the brightness, the value of the gain used in detecting the face in the through image is set as the gain to be used in detecting the face in the pre-image and the threshold value of the correlation in the main part of the detection is set to be a predetermined threshold value for the brightness.

In the case of setting the threshold value for the noise on the basis of the amount of noise, when the shutter release button 19 is semi-depressed, so long as a face is detected in a through image immediately before a pre-image is taken by the use of the gain for the noise, the value of the gain used in detecting the face in the through image is set as the gain to be used in detecting the face in the pre-image and the threshold value of the correlation in the main part of the detection is set to be a predetermined threshold value for the noise.

When the shutter release button 19 is full depressed, so long as a face is detected in a through image immediately before a pre-image is taken by the use of the gain for the backlight and the digital camera is set in the auto-exposure mode and in the strobe light emission inhibiting mode, the value of the gain used in detecting the face in the through image is set as the gain to be used in detecting the face in the running image and the threshold value (the threshold value of the correlation or the like) in the main part of the detection is set to be a predetermined threshold value for the backlight.

Further, the threshold value for the EV value, the threshold value for the brightness or the threshold value for the noise may be set or a plurality of these threshold values may be set.

The CPU 75 controls each element of the digital camera 1 according to signals from the various processing portions such as the control systems (action mode switch 11) and the AF portion 62.

The data bus 76 is connected to the image input controller 61, each of the processing portions 62 to 65, the frame memory 66, the medium control portions 67, the internal memory 68, the display control portion 71, the objective body detecting portion 80, the scene determining portion 82, the parameter control portion 84 and the CPU 75, and each of the pieces of data is transmitted and received by way of the data bus 76.

An operation of the digital camera 1 will be described in brief, hereinbelow. The CPU 75 first determines the working mode of the digital camera 1. When it is determined that the working mode is the reproduction mode, the reproduction is carried out, where an image is displayed on the monitor 18 on the basis of the image data which has been stored in the external recording medium 70. On the other hand, when it is determined that the working mode is the image-taking mode, the CPU 75 displays a though image on the monitor 18 and starts monitoring whether the shutter release button 19 has been semi-depressed and at the same time, the objective body detecting portion 80 detects a objective body from the through image.

Figure 8:
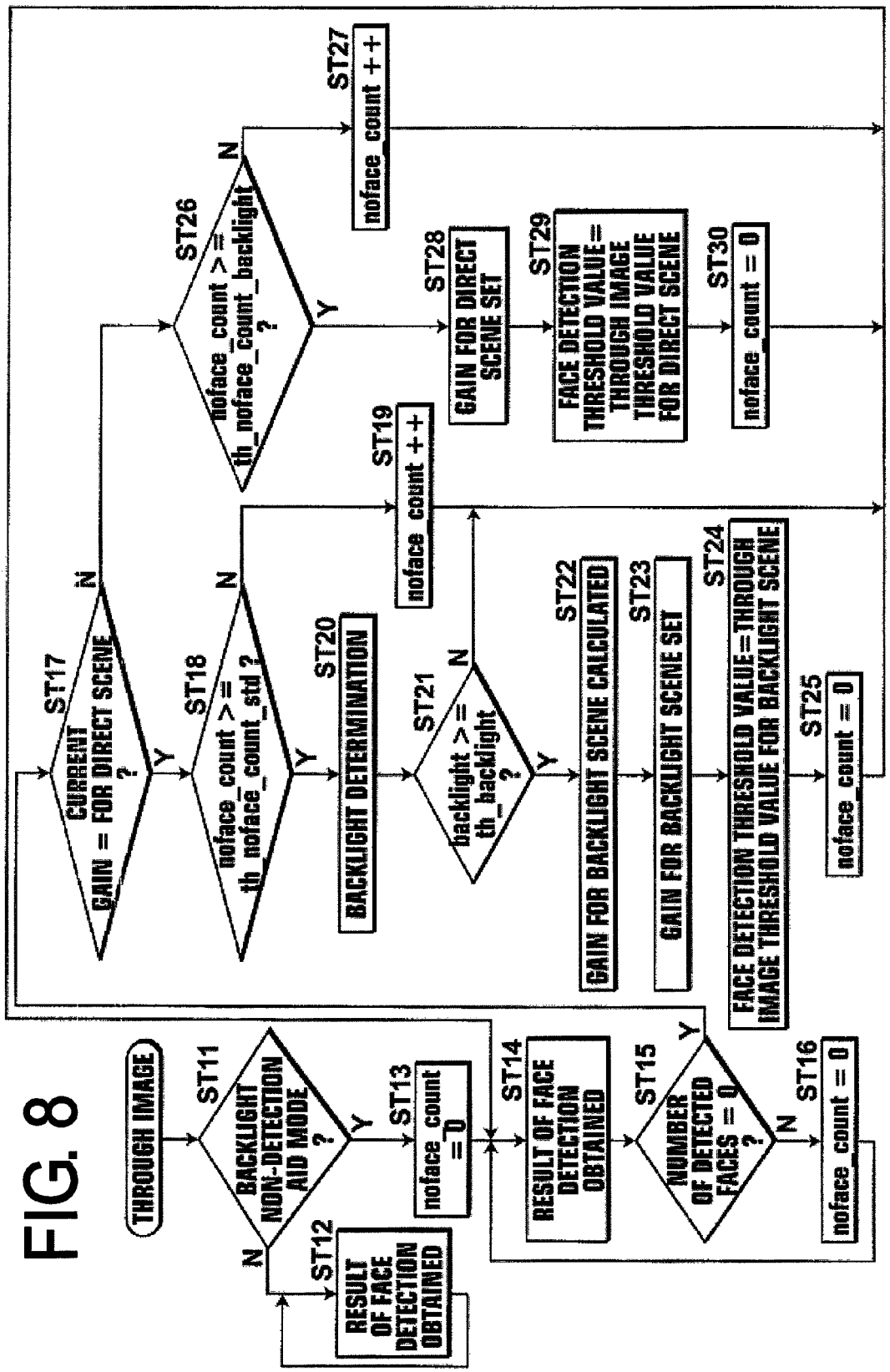
FIG. 8 is a flowchart representing control of the parameter to be used in the objective body detection carried out on a through image by the parameter control portion.

FIG. 8 is a flowchart representing control of the parameter to be used in the objective body (face) detection to be carried out on a through image by the parameter control portion 84. Whether a backlight non-detection aid mode is ON is first determined (step ST11), and when the backlight non-detection aid mode is ON, "0" is set at a value of a "noface_count" representing the number of times for which the face is continuously not detected (step ST13) to obtain a result of detection of the face (step ST14) and whether no face is detected is determined (step ST15). When a face is detected, "0" is set at a value of a "noface_count" (step ST16), the processing is returned to step ST14, and the face detection is continuously carried out. However, when no face is detected, whether the gain used in the detection is a gain for a direct scene is determined (step ST17), and when the gain used in the detection is not a gain for a direct scene, the processing proceeds to step ST26 to be described later. When the gain used in the detection is a gain for a direct scene, whether the value of the "noface_count" representing the number of times for which the face is continuously not detected is not smaller than the value of a "th_noface_count_std" representing a predetermined threshold value of the number of times for which the regular gain is continuously used in the state where no face is detected is determined (step ST18). When step ST18 is denied, the value of noface_count is incremented (step ST19) and the processing is returned to step ST14. When step ST18 is affirmed, the backlight detection by the scene determining portion 82 is carried out (step ST20) and whether the degree of backlight output from the scene determining portion 82 is not smaller than a set threshold value is determined (step ST21). When step ST21 is denied, the processing is returned to step ST14. When it is determined that the degree of backlight is not smaller than a set threshold value, the value of the gain for a backlight scene is determined according to the degree of backlight output from the scene determining portion 82 (step ST22) and the calculated gain is set as a value of the gain for a backlight scene (step ST23). Further, the processing is returned to step ST14 after setting the threshold value of the correlation in the main part of the detection to be a preset threshold value for a backlight scene (step ST24) and setting 0 at the value of noface_count (step ST16).

On the other hand, when it is determined in step ST17 whether the gain used in the detection is a gain for a direct scene and when it is determined that the gain used in the detection is not a gain for a direct scene, whether the value of the "noface_count" representing the number of times for which the face is continuously not detected is not smaller than the value of a "th_noface_count std" representing a predetermined threshold value of the number of times for which the regular gain is continuously used in the state where no face is detected is determined (step ST26). When step ST26 is denied, the value of noface_count is incremented (step ST27) and the processing is returned to step ST14. When step ST26 is affirmed, the value of the gain for a direct scene is set as the value of the gain (step ST28). Further, the processing is returned to step ST14 after setting the threshold value of the correlation in the main part of the detection to be the direct threshold value (step ST29) and setting 0 at the value of noface_count (step ST30).

When the shutter release button 19 is semi-depressed following the objective body detection using the parameter determined by the above described parameter control, a pre-image is taken to obtain the pre-image and detection of a objective body from the pre-image is carried out.

Figure 9:
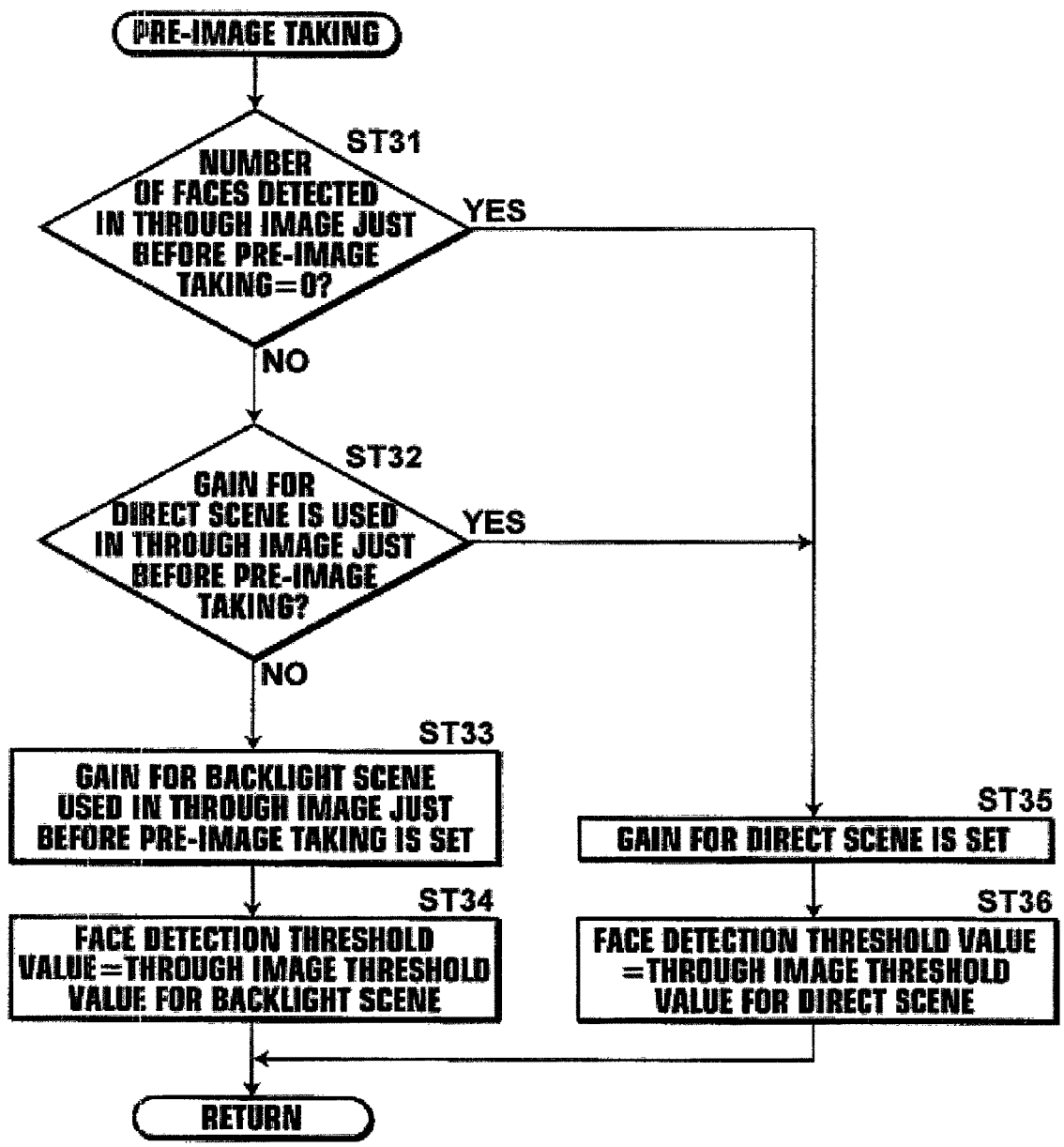
FIG. 9 is a flowchart representing control of the parameter to be used in the objective body detection carried out on a pre-image by the parameter control portion.

FIG. 9 is a flowchart representing control of the parameter to be used in the objective body detection carried out on a pre-image by the parameter control portion 84. Whether no face is detected in the through image immediately before the pre-image is taken is first determined (step ST31). When a face is detected, whether the gain used in the detection of the through image immediately before the pre-image is a gain for a direct scene is determined (step ST32). When the gain used in the detection of the face in the through image immediately before the pre-image is not a gain for a direct scene, the value of the gain used in detection of the face in the through image is set as the value of the gain (step ST33). Further, the processing is returned after setting the threshold value of the correlation in the main part of the detection to be a predetermined threshold value for a backlight scene (step ST34).

When step ST31 is affirmed, and when step ST32 is affirmed, the processing proceeds to step ST35 and the gain is set so that the value of the gain is a value for a direct scene. Further, the processing is returned after setting the threshold value of the correlation in the main part of the detection to be a predetermined threshold value for a direct scene (step ST36).

Following the objective body detection using a parameter determined by the parameter control described above, the AE/AWB portion 63 and the AF portion 62 respectively carry out the AF processing and the AE/AWB processing and the strobe control portion 73 determines the amount of the strobe light on the basis of the pre-image. Then, the CPU 75 determines whether the semi-depression of the shutter release button 19 has been released. When it is determined that the semi-depression of the shutter release button 19 has been released, the CPU 75 displays the through image on the monitor 18, starts monitoring whether the semi-depression of the shutter release button 19 has been released, and returns to the objective body detection carried out on a through-image. When it is determined that the semi-depression of the shutter release button 19 has not been released, the CPU 75 further determines whether the shutter release button 19 has been fully depressed. When it is determined that the shutter release button 19 has not been fully depressed, the CPU 75 returns to determining whether the semi-depression of the shutter release button 19 has been released. When it is determined that the shutter release button 19 has been fully depressed, the CPU 75 executes a running image taking, and carries out the objective body detection on the running image obtained by the running image taking by the use of the parameter controlled by the parameter control portion 84 in the following manner.

Figure 10:
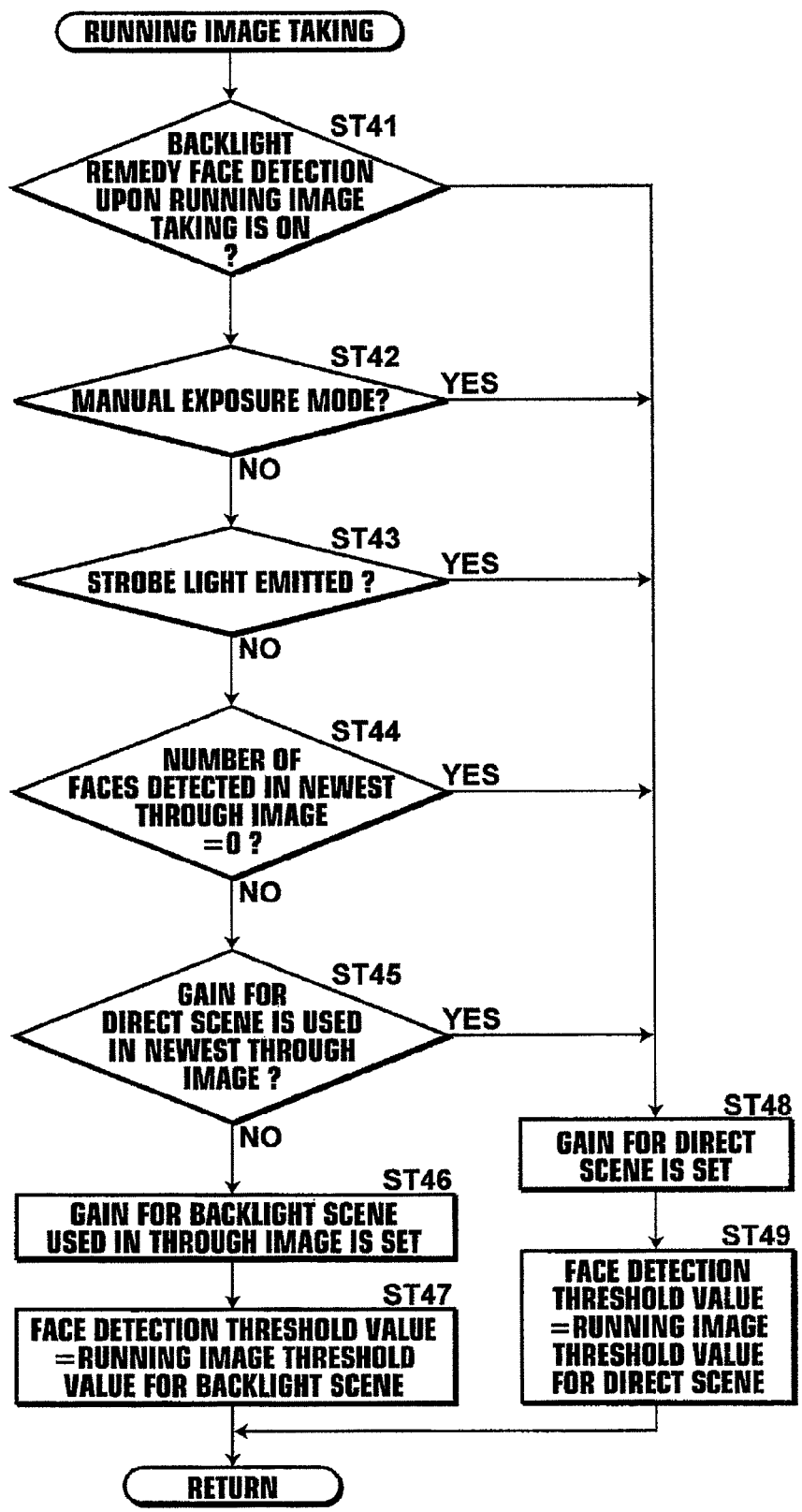
FIG. 10 is a flowchart representing control of the parameter to be used in the objective body detection carried out on a running image by the parameter control portion.

FIG. 10 is a flowchart representing control of the parameter to be used in the objective body detection carried out on a running image by the parameter control portion 84. Whether a backlight remedy face detection mode upon running image taking is ON is first determined (step ST41). When the backlight remedy face detection mode is ON, the parameter control portion 84 determines whether the digital camera 1 is in the manual exposure mode. (step ST42) When step ST42 is denied, whether the strobe lamp 24 has emitted the strobe light is further determined. (step ST43) When step ST43 is denied, whether the face is not detected in the newest result of detection in the through image is further determined. (step ST44) When the face is detected in the newest result of detection in the through image, whether the value of the gain used in the newest result of detection in the through image is for a direct scene is determined. (step ST45) When the value of the gain used in the newest result of detection in the through image is not for a direct scene, the value of the gain is set to be the value of the gain used in detection in the through image. (step ST46) Further, the processing is returned after setting the threshold value of the correlation in the main part of the detection to be a predetermined threshold value for a backlight scene (step ST47).

When step ST41 is negative, when step ST42 is affirmed, when step ST43 is affirmed, when step ST44 is affirmed or when step ST45 is affirmed, the processing proceeds to step ST48 and the gain is set so that the value of the gain is a value for a direct scene. Further, the processing is returned after setting the threshold value of the correlation in the main part of the detection to be a predetermined threshold value for a direct scene (step ST49).

After the objective body detection using a parameter determined by the parameter control described above, an image processing is carried out on a running image obtained by a running image taking and the processed running image is displayed on the monitor 18 as well as the processed running image is recorded on the external recording medium 70. Then, whether the power source of the digital camera 1 is off is determined and when the power source of the digital camera 1 has not been turned off, monitoring whether the shutter release button 19 has been semi-depressed is started and at the same time, the objective body detection of a objective body in the through image is carried out. When the power source of the digital camera 1 has been turned off, the processing is ended.

In the embodiment described above, the parameter used in the objective body detection is controlled according to the result of determination where the scene of an image is determined. By thus controlling the parameter on the basis of the result of determination of the scene to that suitable for the objective body detection in the image, the parameter can be changed to that suitable to detect the objective body from the image even if the image taking situation is changed, whereby the objective body detecting performance can be improved.

When the method of changing the parameter is changed according to the timing at which the image to which the objective body detecting means carries out the objective body detection is taken, the parameter suitable to detect the objective body from the image can be efficiently determined on the basis of the timing information representing the time at which the image is taken.

Figure 7:
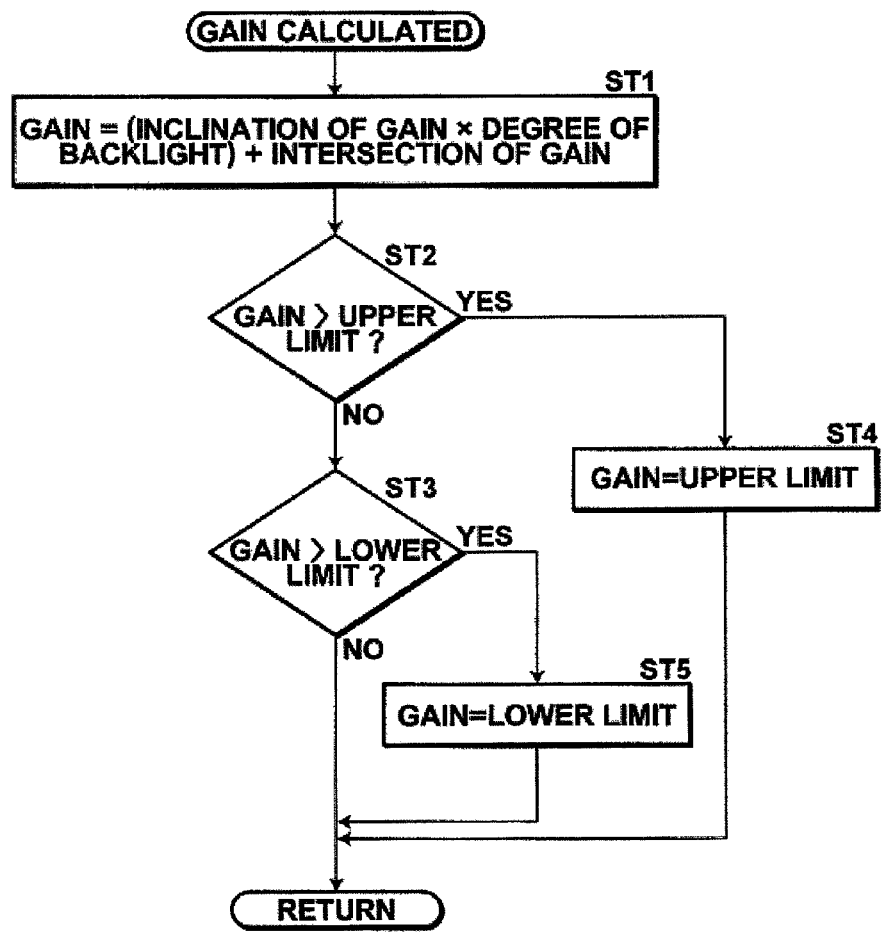
FIG. 7 is a flowchart representing calculation of a value of gain according to the degree of the backlight.

When the running image attached with the information representing functions is displayed on the monitor 18, it preferred that, similarly to the case shown in FIG. 7, the information on the kind of the image-taking mode and the information representing that a objective body has been detected and the set function be displayed on the monitor 18 together with the running image.

Though the face being an objective body in the embodiment described above, the predetermined objective body need not be limited to the face but may be an object other than the face.

Though, digital cameras in accordance with the embodiments of the present invention have been described, application of the present invention need not be limited to the digital cameras but may be, other electronic instruments provided with an electronic imaging function such as a mobile phone with a camera or a PDA with a camera.

What is claimed is:
1. An image-taking system comprising:
   an object detecting unit which detects an object from a taken image,
   a scene determining unit which determines a scene of the image, and
   a parameter control unit which controls a parameter to be used in detecting the object according to result of determination by the scene determining unit,
   wherein the parameter control unit changes the method of controlling the parameter according to a working stage in an image-taking mode of the image-taking system.

2. An image-taking system as defined in claim 1, wherein the working stage in the image-taking mode includes at least one of a taking-through-image status, a taking-pre-image status, and a taking-running-image-status.

3. An image-taking system as defined in claim 2 in which the parameter is a gain in a gain correction used in the object detecting unit or a detecting threshold value used in the object detecting unit.

4. An image-taking system as defined in claim 3, wherein, in case that the working stage has been changed from the taking-through-image status to the taking-pre-image status, the parameter control unit controls the parameter used in detecting the object in the taking-pre-image status based on at least one of the result of the object detecting and the gain in the taking-through-image status.

5. An image-taking system as defined in claim 3, wherein, in case that the working stage has been changed from the taking-through-image status to the taking image status, the parameter control unit controls the parameter used in detecting the object in the taking image status based on at least one of the result of the object detection and the gain in the taking-through-image status.

6. An image-taking system as defined in claim 1 in which the object detecting unit detects the object by detecting the object from the image by the use of a plurality of parameters of different values including the controlled parameter corrected by the parameter control unit and taking as the result of object detection by integrating a plurality of the results of detection.

7. An image-taking system as defined in claim 1 in which the parameter includes one or more of a degree of contour correction in a contour correction, a degree of noise reduction in a noise reduction and a γ curve in a γ correction, which are employed in the object detecting unit.

8. An image-taking system as defined in claim 1, wherein an object is a face and the object detecting unit detects the face after the scene determining unit determines the scene of the image.

9. The image-taking system according to claim 1,
wherein the scene determining unit determines the scene of the image by a backlight determination and one or more of an exposure determination, a brightness determination, and a noise determination
and wherein the working stage in the image-taking mode includes sequence stages which include a taking-through-image status, a taking pre-image status, and a taking image status.

10. The image-taking system as defined in claim 9 in which the object detecting unit detects the object by detecting the object from the image by the use of a plurality of parameters of different values including the controlled parameter corrected by the parameter control unit and taking as the result of object detection by integrating a plurality of the results of detection.

11. The image-taking system as defined in claim 9 in which the parameter includes one or more of a degree of contour correction in a contour correction, a degree of noise reduction in a noise reduction and a γ curve in a γ correction, which are employed in the object detecting unit.

12. The image-taking system as defined in claim 9, wherein an object is a face and the object detecting unit detects the face after the scene determining unit determines the scene of the image.

13. The image-taking system as defined in claim 9, wherein the scene determining unit determines that the scene is one of a backlight scene, a night scene and an underwater scene.

14. The image-taking system as defined in claim 13, wherein the parameter control unit controls the parameter to be used in detecting the object based on a specified characteristic of the scene determined by the scene determining unit.

15. The image-taking system as defined in claim 13, wherein the scene determining unit compares a difference in a scene characteristic between two adjacent unit areas of the image and determines the scene based on a difference result.

16. The image-taking system as defined in claim 9, wherein in a first case in which the image is a through-image obtained in the taking-through-image status of the working stage of the image-taking mode, wherein taking-through-image status is before a shutter release button of the image-taking system is fully-depressed, the parameter control unit controls the parameter according to a determination result obtained by the scene determining unit; and
in a second case in which the image is a running-image obtained in the taking image status of the working stage of the image taking mode, wherein the taking image status is after the shutter release button of the image-taking system is fully depressed, the parameter control unit controls the parameter according to whether a strobe lamp of the image-taking system has emitted a strobe light.

17. The image-taking system according to claim 1
wherein the parameter control unit changes the parameter when no object is detected with the parameter before the change
and wherein the working stage in the image-taking mode includes sequence stages which include a taking-through-image status, a taking pre-image status, and a status.

18. The image-taking system as defined in claim 17 in which the object detecting unit detects the object by detecting the object from the image by the use of a plurality of parameters of different values including the controlled parameter corrected by the parameter control unit and taking as the result of object detection by integrating a plurality of the results of detection.

19. The image-taking system as defined in claim 17 in which the parameter includes one or more of a degree of contour correction in a contour correction, a degree of noise reduction in a noise reduction and a γ curve in a γ correction, which are employed in the object detecting unit.

20. The image-taking system as defined in claim 17, wherein an object is a face and the object detecting unit detects the face after the scene determining unit determines the scene of the image.

21. An image-taking method comprising using one or more computers to perform steps of:
detecting an object from a taken image,
determining a scene of the image, and
controlling a parameter to be used in detecting the object according to result of determination by the scene determining step,
wherein controlling the parameter is performed in accordance a working stage in an image-taking mode of the image-taking system.

22. The image-taking method according to claim 21
wherein the scene of the image is determined by a backlight determination and one or more of an exposure determination, a brightness determination, and a noise determination,
and wherein the working stage in the image-taking mode includes sequence stages which include a taking-through-image status, a taking pre-image status, and a taking image status.

23. An image-taking method according to claim 21 further comprising:
configuring more than one processor to perform the functions of:
detecting the object from the taken image,
determining the scene of the image by a scene determining unit, and
controlling the parameter to be used in detecting the object according to result of determination of the scene determining step, by a parameter control unit,
wherein the parameter is changed when no object is detected with the parameter before the change, and
wherein the working stage in the image-taking mode includes sequence stages which include a taking-through-image status, a taking pre-image status, and a taking image status.

24. An image-taking method according to claim 21 comprising:
configuring more than one processor to perform the functions of:
detecting the object from the taken image,
determining the scene of the image by a scene determining unit, and
changing the parameter to be used in detecting the object according to result of determination of the scene determining step, by a parameter control unit,
wherein the method changing the parameter is in accordance with the working stage in the image-taking mode of an image-taking system, and
the working stage in the image-taking mode includes sequence stages which include a taking-through-image status, a taking pre-image status, and a taking image status.

25. A non-transitory computer reading storage medium embodied with a program causing a computer to perform steps of:
detecting an object from a taken image,
determining a scene of the image, and
controlling a parameter to be used in detecting the object according to result of determination by the scene determining step,
wherein controlling the parameter is performed in accordance with a working stage in an image-taking mode of the image-taking system.

26. The non-transitory computer readable storage medium according to claim 25
wherein the scene of the image is determined by a backlight determination and one or more of an exposure determination, a brightness determination, and a noise determination, and
wherein the working stage in the image-taking mode includes sequence stages which include a taking-through-image status, a taking pre-image status, and a taking image status.

27. The non-transitory computer readable storage medium according to claim 25:
wherein controlling the parameter comprises changing the parameter when no object is detected with the parameter before the change, and
and wherein the working stage in the image-taking mode includes sequence stages which include a taking-through-image status, a taking pre-image status, and a taking image status.

28. The non-transitory computer readable storage medium according to claim 25,
wherein controlling the parameter is changed according to the working stage in an image-taking mode of the image-taking system, and
wherein the working stage in the image-taking mode includes sequence stages which include a taking-through-image status, a taking pre-image status, and a taking image status.

* * * * *